United States Patent Office 3,171,805
Patented Mar. 2, 1965

3,171,805
FLOCCULATION OF SEWAGE
Tzeng Jiueq Suen and Arthur Maurice Schiller, New Canaan, Conn., assignors to American Cyanamid Company, Stamford, Conn., a corporation of Maine
No Drawing. Filed Apr. 29, 1963, Ser. No. 276,182
11 Claims. (Cl. 210—54)

This application constitutes a continuation-in-part of our copending application Serial No. 575,967, filed April 4, 1956, now abandoned.

This invention relates to improvements in the treatment of sewage by agglomerating suspended particles with the aid of cationic polyelectrolyte polymers.

In the treatment of sewage it is necessary that suspended particles be removed. This may be accomplished by adding an agglomerating or flocculating agent to aid in the precipitation, coagulation, filtration, or settling of suspended particles. In the past inorganic materials, such as alum, lime, ferrous or ferric salts, etc. have been added to speed up settling and to aid in filtration. Such prior conventional flocculants may be used in conjunction with the present novel flocculating agents, or the present agents may be used alone.

Recent changes in the composition of domestic sewage have resulted from the use of synthetic detergents instead of soap for washing and general cleaning. Both industrial and household wastes at present may contain considerable quantities of synthetic detergents which keep solid materials suspended. It thus appears that the purpose of the synthetic detergents, as used by the housewife, is to suspend and keep suspended the very particles which in sewage treatment are to be settled out. Many of the synthetic detergents are anionic in character.

It has now been found that if there is added a cationic polyelectrolyte polymer, which in solution has a positive charge on the polymer, which polymer may be considered as derived from a nitrogen base, and which is water-dispersible, such polymer reacts with the synthetic detergent suspending agents, so that it neutralizes the charge on the detergent, and thus permits the natural settling of the particles. Additionally, the cationic polyelectrolyte polymers act as flocculating agents and actually assist in causing the rapid precipitation or fluocculation of solid particles thus serving a double function. The dual effect of both neutralizing the anionic suspending agents and also causing a flocculating effect in their own right results in the cationic polyelectrolyte polymers markedly increasing the rate of settling of solids.

It is to be appreciated that an increase in the settling rate of solids is of greatest importance; as for example in a sewage treatment plant for a community a doubling of the settling rate in effect doubles the capacity of the settling tanks, so that by merely introducing a new flocculating agent, which will double the settling rate, the capacity of the sewage treatment plant is doubled. With the increase in size of many communities and the overloading of sewage treatment plants which have been previously built, the economic advantages of doubling the capacity of a sewage treatment plant by merely changing the flocculant being used, is easily apparent. Actually, the present flocculating agents in many instances will more than double the settling rate and depending upon other conditions will give other advantages, such as a higher density to the settled particles, and an improved filtration rate if filtration is being used in addition to settling.

The present invention is primarily directed to domestic wastes or industrial wastes in which synthetic detergents are present to suspend solid particles. However, many other organic wastes from other sources will also have varying amounts of anionic suspending agents present.

The present invention may be used successfully with various methods of sewage treatment, such as sludge filtration, or digested sludge filtration, activated sludge, or other methods of sewage treatment in which a settling or filtration step is used.

The cationic polyelectrolyte polymers are preferably those having an average molecular weight of at least about 10,000 and in which a nitrogen atom in effect acts as a nitrogen base to give a cationic quality to the polymer. The polymers may be homo-polymers or co-polymers with each other or with other co-monomers containing the grouping $CH_2=CH-R$, where R may be hydrogen, alkyl, aryl, or acyl. The co-polymer should contain a sufficient amount of the cationic monomer to make them water-dispersible if other groupings are present.

The polymers of this type may be prepared directly by polymerization of suitable monomers, or by the after-chemical reaction of other polymers. Homo-polymers or co-polymers from such cationic monomers as following may be used:

(1) N - substituted - (N'-dialkylaminoalkyl) acrylamides such as:
 N-(diethylaminomethyl) acrylamide,
 N-(diethylaminomethyl) methacrylamide,
 N-(dimethylaminomethyl) acrylamide,
 N-(dipropylaminomethyl) acrylamide,
 N-(piperidylmethyl) acrylamide;
(2) Aminoalkylacrylates and dialkylaminoalkylacrylates such as:
 Diethylaminopropylacrylate,
 Dimethylaminoethylacrylate,
 Dimethylaminopropylacrylate;
(3) Vinylpyridine;
(4) Diallylamines such as:
 Diallylbenzylamine,
 Diallylmethylamine,
 Diallylethylamine;
(5) Quaternaries such as:
 Acrylamidopropylbenzyldimethylammonium hydroxides,
 N-methyl-vinylpyridinium chloride,
 Diallyldimethylammonium chloride,
 Diallydiethylammonium chloride,
 Acryloropylbenzyldimethylammonium hydroxide;

and salts of any of these above-listed monomers.

Among the co-monomers, which may be polymerized with the cationic monomers are: styrene, ethylene, propylene, vinylformate, vinylacetate, dialkylmaleates, dialkylfumarates, acrylonitrile, methylacrylate, ethyl methacrylate.

These polyelectrolytes may be added to the sewage either as the free base or as salts with alkali or alkali earth metals, or other inert salt forming anions. The cationic polyelectrolytic polymers, as mentioned above, may have other substituents on them for example the alkyl groups may frequently run from 1 to 4 carbon atoms and the hydrogens on the main chain may be substituted by lower alkyl groups without in any way deleteriously affecting the cationic polyelectrolyte character of the polymer.

The cationic characteristics of course vary to some extent with the pH of the solution in which the water-soluble cationic polyelectrolytic polymer is dissolved. But inasmuch as domestic sewage is usually within the range of about pH 6.9 to 7.1 the characteristics of the polymers compared with water may be used as guide to determine their suitability.

The cationic polyelectrolytic polymers which are suitable may be either added dry or dissolved in water to the sewage at the time of usage. It is usually most convenient to predissolve the cationic polyelectrolyte polymer as it is easier to rapidly and effectively disperse them if pre-dissolved, and it is easier to meter liquids than to add dry solids.

The higher molecular weight polymers up to in the neighborhood of 4 million are frequently slightly less soluble than the lower molecular weights, and while eminently satisfactory may require a little additional effort to insure their solution.

Usually from 0.1 to 1000 parts per million of the cationic polyelectrolytic polymer may be added, depending upon the dilution of the sewage, and the concentration of anionic detergents which may be present. For many domestic sewages from 0.5 to 20 parts per million is satisfactory. It is frequently more convenient to determine the amount of added cationic polyelectrolyte polymer from the amount of solids present in the sewage, rather than on the basis of the quantity of sewage. From about 2% to 20% of the cationic polyelectrolyte polymer based on the suspended solids in the raw sewage is effective.

As illustrative, but not in limitation, of the settling which is expedited by the cationic polyelectrolyte polymers is the following data which was obtained by carrying out experiments in Imhoff Cones on raw sewage, after the grit had been removed therefrom, to which the reaction product of polyacrylamide-formaldehyde-diethylamine had been added. The particular sewage being used had 158 parts per million of suspended solids and the results are as shown in the following table:

*Example 1*

| Run | Percent Additive on Sewage Solids | Time, Minutes | Volume Settled, ml. | Wgt. Dried Settled Solids, g. | Percent of Suspended Solids Settled Out |
|---|---|---|---|---|---|
| 1 | None | 15 | 6 | 0.0666 | 42.2 |
| 2 | None | 60 | 7 | 0.0717 | 45.3 |
| 3 | 10 | 15 | 5.5–6.0 | 0.0822 | 52.0 |
| 4 | 10 | 60 | 7.0 | 0.0901 | 57.0 |
| 5 | 20 | 30 | 7.0 | 0.0839 | 53.1 |

The effect of the diethylaminomethylacrylamide-acrylamide copolymers can be seen from these results. A more effective settling is obtained in 15 minutes using the cationic polyelectrolyte polymer than is obtained in 60 minutes without it. In effect this would be equivalent to quadrupling the capacity of the settling tank, with a higher recovery of suspended solids.

Similar results are obtained using other cationic polyelectrolyte polymers. The following give similar improvements in flocculation:

*Example 2*

A copolymer prepared from 90 parts acrylamide and 10 parts of diethylaminopropylacrylate.

*Example 3*

A copolymer from 90 parts methacrylamide and 10 parts 2-vinylpyridine.

*Example 4*

A copolymer prepared from 80 parts acrylamide and 20 parts diallylmethylamine.

*Example 5*

A copolymer prepared from 75 parts of acrylamide and 25 parts diallyldimethylammonium chloride.

The choice of the cationic polyelectrolyte polymer is determined largely by commercial considerations of cost and availability.

We claim:
1. In the method of treating domestic and industrial wastes containing anionic suspending agents, the improvement which comprises: treating the waste to improve the rate of flocculation by adding thereto a small amount of a synthetic cationic polyelectrolyte polymer having an average molecular weight of at least 10,000.
2. The method of claim 1 in which the polyelectrolyte is an N-substituted-(N'-dialkylaminoalkyl)-acrylamide.
3. The method of claim 1 in which the polyelectrolyte is a diethylaminomethylacrylamide acrylamide copolymer.
4. The method of claim 1 in which the polyelectrolyte is a polymer of acrylamide and diethylaminopropylacrylate.
5. The method of claim 1 in which the polyelectrolyte is a methacrylamide and vinylpyridine copolymer.
6. The method of claim 1 in which the polyelectrolyte is an acrylamide and diallylmethylamine copolymer.
7. The method of claim 1 in which the polyelectrolyte is an acrylamide and diallyldimethylammonium chloride copolymer.
8. A method of treating domestic wastes comprising an aqueous dispersion of solids at least in part dispersed by anionic suspending agents comprising adding to said waste, containing solid particles dispersed by an anionic suspending agent, from about 2% to 20%, based on the weight of suspended solids, of a synthetic cationic polyelectrolyte polymer having an average molecular weight of at least 10,000, reacting said polymer in part with said suspending agent, whereby the suspending action of said suspending agent is minimized, and the remaining amount of said polymer is sufficient to flocculate and agglomerate the suspended solids, and separating the flocculated and agglomerated solids from the aqueous liquid.
9. The method of claim 8 in which the polyelectrolyte is a diethylaminomethylacrylamide acrylamide copolymer.
10. A method of clarifying predominately organic domestic and industrial waste comprising an aqueous dispersion of solids including raw sewage, at least in part, dispersed by anionic suspending agents comprising adding to said waste, containing solid particles dispersed by an anionic suspending agent, from about 2% to 20%, based on the weight of suspended solids, of a synthetic cationic polyelectrolyte polymer having an average molecular weight of at least 10,000, which polymer is a polymer of acrylamide having at least some of the amide groups substituted by diethylaminomethyl groups, reacting said polymer in part with said anionic suspending agent, whereby the suspending action is minimized, and the remaining amount of said polymer is sufficient to flocculate and agglomerate the suspended solid including organic matter, and separating the flocculated and agglomerated solids from the aqueous liquids.
11. The method of claim 10 in which the raw sewage has a pH within the range of about 6.9 to 7.1.

References Cited by the Examiner

UNITED STATES PATENTS

| 2,795,545 | 6/57 | Gluesenkamp | 210—54 X |
| 2,937,143 | 5/60 | Goren | 210—54 X |
| 2,980,609 | 4/61 | House et al. | 210—54 |

FOREIGN PATENTS

| 154,799 | 1/54 | Australia. |
| 163,501 | 6/55 | Australia. |

MORRIS O. WOLK, *Primary Examiner.*